US008977388B2

United States Patent
Jacobsen et al.

(10) Patent No.: US 8,977,388 B2
(45) Date of Patent: Mar. 10, 2015

(54) PLATFORM PERTURBATION COMPENSATION

(75) Inventors: Stephen C. Jacobsen, Salt Lake City, UT (US); John McCullough, Salt Lake City, UT (US); Fraser M. Smith, Salt Lake City, UT (US); Marc X. Olivier, Salt Lake City, UT (US)

(73) Assignee: Sarcos LC, Salt Lake City, UT (US)

( * ) Notice: Subject to any disclaimer, the term of this patent is extended or adjusted under 35 U.S.C. 154(b) by 277 days.

(21) Appl. No.: 13/332,138

(22) Filed: Dec. 20, 2011

(65) Prior Publication Data

US 2012/0277901 A1 Nov. 1, 2012

Related U.S. Application Data

(60) Provisional application No. 61/481,089, filed on Apr. 29, 2011, provisional application No. 61/481,110, filed on Apr. 29, 2011, provisional application No. 61/481,103, filed on Apr. 29, 2011.

(51) Int. Cl.
*G06F 7/00* (2006.01)
*B66C 13/44* (2006.01)
*B25J 3/04* (2006.01)
*B25J 5/00* (2006.01)
(Continued)

(52) U.S. Cl.
CPC . *B66C 13/44* (2013.01); *B25J 3/04* (2013.01); *B25J 5/005* (2013.01); *B25J 9/0087* (2013.01); *B66C 1/425* (2013.01)
USPC ........... 700/228; 700/247; 700/248; 700/246; 318/568.22

(58) Field of Classification Search
USPC ........................................................ 700/228
See application file for complete search history.

(56) References Cited

U.S. PATENT DOCUMENTS

| 1,880,138 A | 9/1932 | Franz |
| 3,280,991 A | 10/1966 | Melton et al. |

(Continued)

FOREIGN PATENT DOCUMENTS

| EP | 0616275 | 9/1998 |
| EP | 1258324 | 11/2002 |

(Continued)

OTHER PUBLICATIONS

PCT/US2012/035570; filed Apr. 27, 2012; Raytheon Company; International Search Report dated Feb. 8, 2013.

(Continued)

*Primary Examiner* — Gene Crawford
*Assistant Examiner* — Kyle Logan
(74) *Attorney, Agent, or Firm* — Thorpe North & Western LLP

(57) ABSTRACT

A method for compensating for a perturbation external to a platform having a plurality of mechanical arms in accordance with an embodiment of the technology includes detecting a normal positional and/or orientational measurement of the platform using a sensor. A perturbed positional and/or orientational measurement of the platform can also be detected using the sensor. The normal positional and/or orientational measurement and the perturbed positional and/or orientational measurement can be compared to determine a positional and/or orientational difference. A position and/or orientation of a mechanical arm can be adjusted to compensate for the perturbation based on the positional and/or orientational difference.

25 Claims, 8 Drawing Sheets

(51) Int. Cl.
*B25J 9/00* (2006.01)
*B66C 1/42* (2006.01)

(56) References Cited

U.S. PATENT DOCUMENTS

| | | | |
|---|---|---|---|
| 4,046,262 | A | 9/1977 | Vykukal et al. |
| 4,179,233 | A | 12/1979 | Bromell et al. |
| 4,251,791 | A | 2/1981 | Yanagisawa et al. |
| 4,483,407 | A | 11/1984 | Iwamoto et al. |
| 4,567,417 | A | 1/1986 | Francois et al. |
| 4,591,944 | A | 5/1986 | Gravel |
| 4,661,032 | A | 4/1987 | Arai |
| 4,666,357 | A | 5/1987 | Babbi |
| 4,762,455 | A | 8/1988 | Coughlan et al. |
| 4,768,143 | A | 8/1988 | Lane et al. |
| 4,853,874 | A | 8/1989 | Iwamoto et al. |
| 4,883,400 | A | 11/1989 | Kuban et al. |
| 4,915,437 | A | 4/1990 | Cherry |
| 4,921,292 | A | 5/1990 | Harwell et al. |
| 4,997,095 | A | 3/1991 | Jones et al. |
| 5,004,391 | A | 4/1991 | Burdea |
| 5,038,089 | A | 8/1991 | Szakaly |
| 5,072,361 | A | 12/1991 | Davis et al. |
| 5,101,472 | A | 3/1992 | Repperger |
| 5,105,367 | A | 4/1992 | Tsuchihashi et al. |
| 5,239,246 | A | 8/1993 | Kim |
| 5,282,460 | A | 2/1994 | Boldt |
| 5,336,982 | A * | 8/1994 | Backes ............... 318/568.22 |
| 5,399,951 | A | 3/1995 | Lavallee et al. |
| 5,797,615 | A | 8/1998 | Murray |
| 5,845,540 | A | 12/1998 | Rosheim |
| 5,949,686 | A | 9/1999 | Yoshinada et al. |
| 5,967,580 | A | 10/1999 | Rosheim |
| 5,994,864 | A | 11/1999 | Inoue et al. |
| 6,016,385 | A | 1/2000 | Yee et al. |
| 6,170,162 | B1 | 1/2001 | Jacobsen et al. |
| 6,272,924 | B1 | 8/2001 | Jansen |
| 6,301,526 | B1 | 10/2001 | Kim et al. |
| 6,338,605 | B1 | 1/2002 | Halverson et al. |
| 6,340,065 | B1 | 1/2002 | Harris |
| 6,360,166 | B1 | 3/2002 | Alster |
| 6,394,731 | B1 | 5/2002 | Konosu et al. |
| 6,430,473 | B1 | 8/2002 | Lee et al. |
| 6,507,163 | B1 | 1/2003 | Allen |
| 6,554,342 | B1 | 4/2003 | Burnett |
| 6,659,703 | B1 | 12/2003 | Kirkley |
| 6,663,154 | B2 | 12/2003 | Pancheri |
| 7,396,057 | B2 | 7/2008 | Ye et al. |
| 7,405,531 | B2 | 7/2008 | Khatib et al. |
| 7,409,882 | B2 | 8/2008 | Massimo et al. |
| 7,410,338 | B2 | 8/2008 | Schiele et al. |
| 7,783,384 | B2 | 8/2010 | Kraft |
| 7,862,524 | B2 | 1/2011 | Carignan et al. |
| 8,024,071 | B2 | 9/2011 | Komatsu et al. |
| 8,151,401 | B2 | 4/2012 | Cheyne |
| 8,452,447 | B2 | 5/2013 | Nixon |
| 8,473,101 | B2 * | 6/2013 | Summer ............... 700/247 |
| 8,529,582 | B2 | 9/2013 | Devengenzo et al. |
| 8,560,118 | B2 | 10/2013 | Greer et al. |
| 2003/0152452 | A1 | 8/2003 | Hodgson |
| 2004/0037681 | A1 | 2/2004 | Marcotte |
| 2005/0193451 | A1 * | 9/2005 | Quistgaard et al. ........... 901/9 |
| 2006/0149419 | A1 * | 7/2006 | Ogawa et al. ............... 700/245 |
| 2006/0184275 | A1 | 8/2006 | Hosokawa et al. |
| 2006/0245897 | A1 | 11/2006 | Hariki et al. |
| 2007/0105070 | A1 | 5/2007 | Trawick |
| 2007/0123997 | A1 | 5/2007 | Herr et al. |
| 2008/0281468 | A1 * | 11/2008 | Jacobsen et al. ............ 700/246 |
| 2009/0038258 | A1 * | 2/2009 | Pivac et al. ............... 52/749.14 |
| 2009/0039579 | A1 | 2/2009 | Clifford et al. |
| 2009/0210093 | A1 | 8/2009 | Jacobsen |
| 2010/0089855 | A1 * | 4/2010 | Kjolseth ................ 212/276 |
| 2010/0198402 | A1 | 8/2010 | Greer et al. |
| 2011/0046781 | A1 * | 2/2011 | Summer ............... 700/248 |
| 2011/0071677 | A1 | 3/2011 | Stillman |
| 2012/0237319 | A1 | 9/2012 | Jacobsen et al. |

FOREIGN PATENT DOCUMENTS

| | | |
|---|---|---|
| JP | 52013252 | 2/1977 |
| JP | H01-295772 | 11/1989 |
| JP | H02-51083 | 4/1990 |
| JP | H03-85398 | 8/1991 |
| JP | HO4 44296 | 4/1992 |
| JP | 5004177 | 1/1993 |
| JP | H07-1366 | 1/1995 |
| JP | 7060679 | 3/1995 |
| JP | H07-112377 | 5/1995 |
| JP | HO7-31291 | 6/1995 |
| JP | H07-246578 | 9/1995 |
| JP | 9011176 | 1/1997 |
| JP | 11130279 | 5/1999 |
| JP | 2005/334999 | 12/2005 |
| WO | WO 2007/144629 | 12/2007 |
| WO | WO 2009/143377 | 11/2009 |

OTHER PUBLICATIONS

PCT/US2012/038811; filed Apr. 27, 2012; Raytheon Company; International Search Report dated Feb. 13, 2013.
Bauman; Utah Firm Markets on Big Gorilla of an Arm; Deseret News; Jan. 27, 1993; 2 pages.
Jacobsen; Science, Robotics, and Superheroes; Presented at University of Utah's Science at Breakfast, Mar. 17, 2010; 16 pages.
Heavy-Duty Magnetic Base, 300 lb (1334 N) Holding Force, ¼-20Thread; Newport; http://search.newport.com/?q=.. *&x2=sku &q2=200; as accessed Apr. 23, 2011; 1 page.
Jacobsen et al; Research Robots for Applications in Artificial Intelligence, Teleoperation and Entertainment; The International Journal of Robotics Research; Apr.-May 2004; pp. 319-330; vol. 23, No. 4-5.
Kim et al; A Force Reflected Exoskeleton-Type Masterarm for Human-Robot Interaction; IEEE Transactions on Systems, Man and Cybertentics—Part A: Systems and Humans; Mar. 2005; pp. 198-212; vol. 35, No. 2.
Manipulator Dynamics; Amikabir University of Technology; Computer Engineering and Information Technology Department; Power Point; 44 pages.
Schuler et al; Dextrous Robot Arm; In Proceedings of the 8$^{th}$ ESA Workshop on Advanced Space Technologies for Robotic and Automation; 'ASTRA 2004'' ESTEC, Noordwijk, The Netherlands, Nov. 2-4, 2004; 8 pages.
Song et al; Kinematics Analysis and Implementation of a Motion-Following Task for a Humanoid Slave Robot Controlled by an Exoskeleton Master Robot; International Journal of Control, Automation and Systems; Dec. 2007; pp. 681-690; vol. 5, No. 6.
Tmsuk, Rescue Robot "T-☐☐53" release Control Technologies to Control the Synchronous Operation of the Arm; http://robot.watach.impress.co.ip/cda/news/2007/07/18/564.1-html; as accessed Sep. 1, 2011; 5 pages.
U.S. Appl. No. 13/332,129, filed Dec. 20, 2011, Stephen C. Jacobsen.
U.S. Appl. No. 13/332,146, filed Dec. 20, 2011, Stephen C. Jacobsen.
U.S. Appl. No. 13/332,152, filed Dec. 20, 2011, Stephen C. Jacobsen.
U.S. Appl. No. 13/332,160, filed Dec. 20, 2011, Stephen C. Jacobsen.
U.S. Appl. No. 13/421,612, filed Mar. 15, 2012, Stephen C. Jacobsen.
U.S. Appl. No. 13/332,165, filed Dec. 20, 2011, Stephen C. Jacobsen.
Yeates; Utah-Built Robot Safeguards the Workplace; http://www.ksl.com?nid=148&sid=17654421&autostart=y; Oct. 13, 2011; 3 pages.
Giant Robot Grabbing Hands Grab All They Can; Jul. 17, 2007; 3 pages ; www.digitalworldtokyo.com/index.php/digital_tokyo/articles/giant_robot_grabbing_hands_grab_all_they_can/.
Industrial Magnetics, Inc.—PowerLift® Magnets; www.magnetics.com/product.asp?ProductID=1 ; 2 pages; as accessed Nov. 6, 2012.
Magnetic Base; www.ask.com/wiki/magnetic_base; 2 pages; page last updated Sep. 12, 2012.
U.S. Appl. No. 13/332,129, filed Dec. 20, 2011, Stephen C. Jacobsen; office action issued Dec. 23, 2013.

(56) References Cited

OTHER PUBLICATIONS

Barras; "Stabilization of a Biped Robot with its arms—A Practical Approach"; May 1, 2010; http: //biorob.epfl.ch/files/content/sites/biorob/filed/users/1702 20/public/Report.pdf; retrieved on Jul. 10, 2013.

Moosavian, et al.; "Dynamics Modeling and Tip-Over Stability of Suspended Wheeled Mobile Robots with Multiple Arms"; Oct. 29, 2007; IEEE; pp. 1210-1215.

PCT/US2012/035609; filed Apr. 27, 2012; Raytheon Company; search report dated Jul. 29, 2013.

PCT/US2012/035620; filed Apr. 27, 2012; Raytheon Company; search report dated Jul. 7, 2013.

PCT/US2012/035592; filed Apr. 27, 2012; Raytheon Company; search report dated Aug. 2, 2013.

PCT/US2012/035553; filed Apr. 27, 2012; Raytheon; International Search Report dated Oct. 31, 2012.

U.S. Appl. No. 13/332,146, filed Dec. 20, 2011, Stephen C. Jacobsen; office action dated Jul. 24, 2014.

U.S. Appl. No. 13/332,152, filed Dec. 20, 2011, Stephen C. Jacobsen; notice of allowance mailed Aug. 20, 2014.

PCT/US2012/035511; filed Apr. 27, 2012; Raytheon Company; International Search report dated Mar. 4, 2013.

U.S. Appl. No. 13/332, 160, filed Dec. 20, 2011, Stephen C. Jacobsen; office action dated Mar. 12, 2014.

U.S. Appl. No. 13/332,152, filed Dec. 20, 2011, Stephen C. Jacobsen; office action dated Mar. 28, 2014.

U.S. Appl. No. 13/332,129, filed Dec. 20, 2011, Stephen C. Jacobsen; office action dated Jun. 17, 2014.

U.S. Appl. No. 13/332,160, filed Dec. 20, 2011, Stephen C. Jacobsen; notice of allowance mailed Jul. 8, 2014.

Aliens(Movie), Starring Sigourney Weaver, Directed by James Cameron, Written by James Cameron, David Giler, Walter Hill, Dan O'Bannon, and Ronald Shuset, Released 1985 by Twentieth Century Fox, Scenes at Playtime 88:26:31-00:26:59 & 02:08:25-02:10:39 Non-Patent Literature documentation; Aliens(1986)—IMDb; downloaded Sep. 27, 2014; 4 pages; hhttp://www.imdb.com/title/tt10090605/.

U.S. Appl. No. 13/421,612, filed Mar. 15, 2012; Stephen C. Jacobsen; office action dated Oct. 7, 2014.

U.S. Appl. No. 13/332,129, filed Dec. 20, 2011; Stephen C. Jacobsen; Notice of Allowance mailed Oct. 24, 2014.

U.S. Appl. No. 13/332,146, filed Dec. 20, 2011; Stephen C. Jacobsen; office action Nov. 17, 2014.

US Application 13/332,165; filed Dec. 20, 2011; Stephen C. Jacobsen; office action dated Jan. 07, 2015.

* cited by examiner

PLATFORM PERTURBATION COMPENSATION

PRIORITY DATA

This application claims the benefit of U.S. Provisional Application Ser. No. 61/481,089, filed Apr. 29, 2011, which is incorporated by reference herein in its entirety. This application also claims the benefit of U.S. Provisional Application Ser. No. 61/481,110, filed Apr. 29, 2011; 61/481,103, filed Apr. 29, 2011; 61/481,099, filed Apr. 29, 2011; 61/481,095, filed Apr. 29, 2011; and 61/481,091, filed Apr. 29, 2011, each of which are incorporated by reference herein in their entirety.

BACKGROUND

Lifting and moving heavy objects by hand can be time consuming and difficult work. Furthermore, the lifting or moving of heavy objects can result in physical strain leading to a variety of orthopedic injuries, particularly to the back. As a result, various types of lifting devices have been devised which assist in lifting and moving objects. These devices can save time and effort, as well as reduce or eliminate physical strain caused by lifting and moving actions.

Some example lifting devices include hoists, jacks, scaffolds and platform mechanisms. In some applications, fork lifts, cranes, and other devices are used to move boxes, machinery, or a myriad of other types of loads. Many lifting devices may perform one particular lifting function, but are not well suited for different types of lifting functions. Some lift devices are large and bulky and can lift and move heavy loads, but may not be well suited for applications in which agility, maneuverability, or delicacy is desired. Other lift devices may be smaller and more maneuverable, but are not well suited for heavy loads.

In some applications, lift systems are used to lift or move loads with a weight great enough to unbalance the lift system. For example, a load may be held a distance away from a base of the lift system, thus changing the center of gravity of the system. Lift systems that are not anchored or which do not include some form of stabilizer can tip over, or be restricted in the loads they are able to lift, as a result of the changing center of gravity, thus risking injury to people and damage to property. Even so, typical lift systems are not able to dynamically balance in response to shifting loads or perturbations to the lift system. Furthermore, typical lift systems are unable to account for shifting of objects, surfaces, and the like relative to the load.

SUMMARY

The present technology provides for platform perturbation compensation in a versatile lift device. An example method for compensating for a perturbation external to a platform having a plurality of mechanical or robotic arms supported thereon includes detecting a normal positional measurement of the platform using a sensor. A perturbed positional measurement of the platform can also be detected using the sensor. The normal positional measurement and the perturbed positional measurement can be compared to determine a positional difference. A position of a mechanical arm can be adjusted to compensate for the perturbation based on the positional difference.

A perturbation compensating platform in accordance with an example can include individually controllable mechanical or robotic arms coupled to the platform. A position detecting sensor can be coupled to the platform and/or at least one of the mechanical arms. The position detecting sensor can detect a perturbation in a position of the platform. A perturbation compensation module in communication with the mechanical arms and the position detecting sensor can cause to be adjusted a position of at least one of the mechanical arms to compensate for the perturbation.

An example system for compensating for a perturbation external to a platform having a plurality of mechanical arms can include a processor and a memory. The memory can include program instructions that facilitate the performing of various operations via the processor. For example, the program instructions can be used to identify a normal position of the platform, detect a perturbed position of the platform, compare the normal and perturbed position to determine a position difference and transmit a control signal to at least one of the plurality of mechanical arms to move to compensate for the perturbation based on the position difference.

A computer readable medium is provided in accordance with an example which includes program instructions for compensating for a perturbation external to a platform having a plurality of mechanical arms. The program instructions, when executed by a processor, can function as a position identification module, a data analysis module, a perturbation compensation module, and a control module. The position identification module can be operable to receive and store normal and perturbed positional data about the platform. The data analysis module can be operable to analyze the normal and perturbed positional data and identify a difference in at least one dimension between the normal and perturbed positional data. The perturbation compensation module can be operable to determine mechanical arm movement instructions to compensate for the difference in the at least one dimension. The control module can be operable to receive the mechanical arm movement instructions and send control signals to the mechanical arms to cause the mechanical arms to move based on the mechanical arm movement instructions.

DETAILED DESCRIPTION

Figure 1:
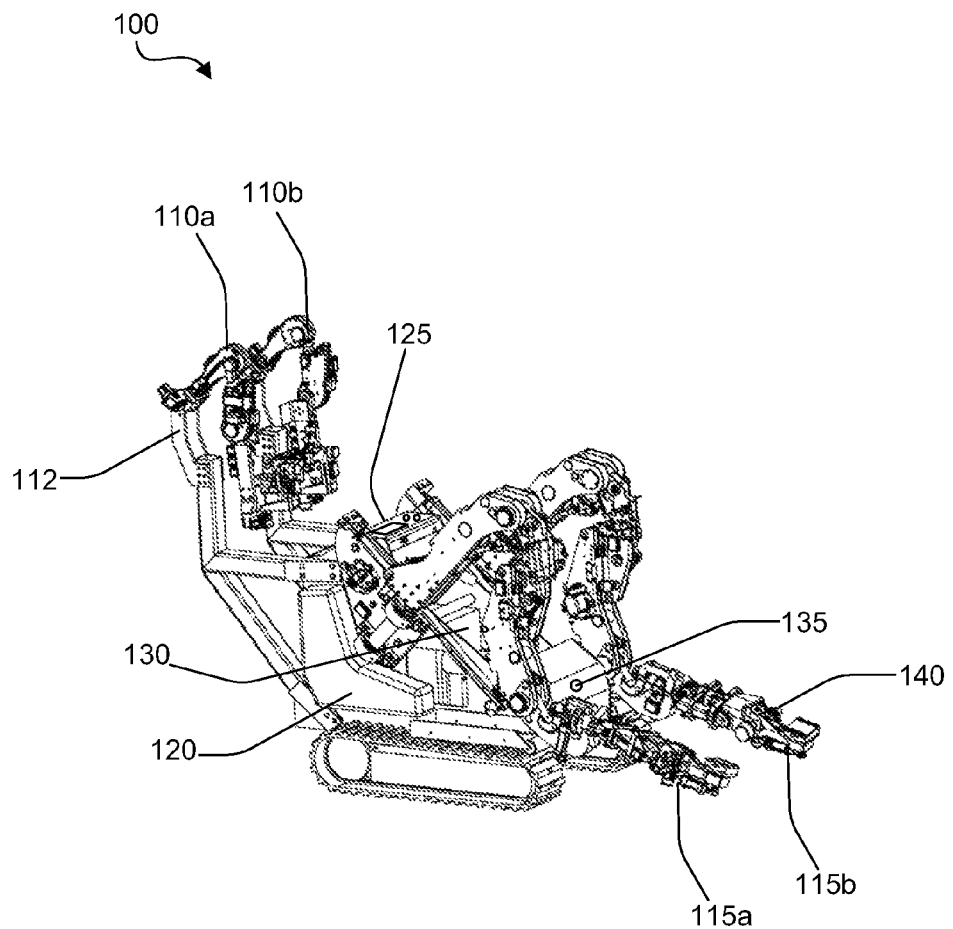
FIG. 1 is a perspective view of perturbation compensating platform in accordance with an example of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

The present invention is related to copending nonprovisional U.S. patent application Ser. No. 13/332,165, filed Dec. 20, 2011, and entitled, "Teleoperated Robotic System"; Ser. No. 13/332,152, filed Dec. 20, 2011, and entitled, "System and Method for Controlling a Tele-Operated Robotic Agile Lift System"; Ser. No. 13/332,146, filed Dec. 20, 2011, and entitled, "Robotic Agile Lift System with Extremity Control"; Ser. No. 13/332,129, filed Dec. 20, 2011, and entitled, "Multi-degree of Freedom Torso Support for Teleoperated Robotic Agile"; Ser. No. 13/332,160, filed Dec. 20, 2011, and entitled, "Variable Strength Magnetic End Effector for Lift Systems", each of which is incorporated by reference in its entirety herein.

Definitions

The following terminology will be used in accordance with the definitions set forth below.

As used herein, the terms "kinematically equivalent" or "kinematic equivalence" refer to a relationship between two or more separate systems of rigid bodies, wherein the rigid bodies of each system are linked by rotational joints to provide rotational degrees of freedom (DOF). Kinematically equivalent systems have similar corresponding rotational DOF, which are joined by similar corresponding linkages that are proportional in length between the systems. It is important to note that "equivalent" or "equivalence" does not refer to a kinematic identity between the systems. Indeed, "kinematically equivalent" or "kinematic equivalence" can include some degree of variation from true kinematic identity, as is illustrated further below and throughout the present disclosure.

As used herein, the terms "perturb or "perturbation" refer to a secondary influence on a system that causes at least a slight deviation. For example, the deviation can be the result of an application of a force to a device. As another example, a change in position, orientation, inclination, etc. of a base supporting a device can be a perturbation external to the device. Likewise, the application of a force originating from something other than the device may be an external perturbation. A perturbation may include a deviation in a reference location or object relative to the device. For example, a truck moving relative to a device situated on the ground adjacent to the truck can be a perturbation or deviation in a system. Also, a perturbation can be the result of movement of the device itself. Thus, for example, a device moving along a contoured, static surface will be perturbed as contours in the surface are encountered.

As used herein, the singular forms "a," and, "the" include plural referents unless the context clearly dictates otherwise. Thus, for example, reference to "a mechanical arm" includes one or more of such mechanical arms and reference to a "degree of freedom" (DOF) includes reference to one or more of such DOFs (degrees of freedom).

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

The Disclosure

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the perturbation compensating platform, or the related devices or methods, individual or separate descriptions are considered applicable to one other, whether or not explicitly discussed in the context of a particular example or embodiment. For example, in discussing the perturbation compensating platform per se, the device, system, and/or method embodiments are also included in such discussions, and vice versa.

Furthermore, various modifications and combinations can be derived from the present disclosure and illustrations, and as such, the following figures should not be considered limiting.

Illustrated in FIG. 1 is a teleoperated, perturbation compensating lift system 100. The system can include master control arms 110a, 110b, slave arms (mechanical or robotic arms) 115a, 115b, and a platform 120. In use, a user manipulates the master control arms to control movement of the slave arms. The platform can be for example mobile, as shown in the figure, or fixed at a permanent location. In one aspect, the platform can provide support for the slave arms. In another aspect, the platform can provide support for the master control arms and for a teleoperator, or user, of the lift system. Thus, a mobile platform can allow the lift system to be moved from place to place to locate the slave arms in a position for use. Additionally, the user can be positioned on the platform, such that the user can see and hear, directly, the slave arms and the workspace or zone of operation in which the slave arms operate. Visual and/or audio information can enable the user to accurately manipulate the master control arms to control movement of the slave arms. In one aspect, the user and master control arms can be remotely located relative to the slave arms. In this case, the lift system can include a camera, microphone, or other instrument to convey visual and/or audio information to the remote user. With images and/or sounds reproduced from the slave arm workspace, the user can manipulate the master control arms to control movement of the slave arms in the workspace.

The master control arm is configured to be manipulated by the user to control movement of a slave arm. For example, the user can grasp a handle located at a distal end of the master control arm 110a to manipulate the master control arm. In general, the master control arm can include joints and linkages that correspond to the user's arm, such that movement of the user's arm causes the master control arm to move in a manner similar to the user's movement. The slave arm can include joints and linkages that correspond to the master control arm and, thus, the user's arm as well. The movement of the master control arm can then cause the slave arm to move in a manner similar to the movement of the master control, thus allowing the user to control movement of the slave arm.

The master control arms 110a, 110b, as well as the slave arms 115a, 115b, can include actuators associated with the DOFs of the arms. The actuators can be used to enable or facilitate force reflection or force feedback from the slave to the master control arm, and therefore to the user, as discussed further below. The actuators can also be used to enable gravity compensation of the arms as well. In one aspect, there is one actuator for each DOF of the arms. The actuators can be linear actuators, rotary actuators, and so forth. The actuators can be operated by electricity, hydraulics, pneumatics, and so forth.

In one aspect, the master control arm 110a can be kinematically equivalent to a user's arm from the shoulder to the wrist. A typical human arm includes seven degrees of freedom from the shoulder to the wrist. Specifically, a human shoulder includes three DOF: abduction/adduction, flex/extend, and humeral rotation. A human elbow includes one DOF. A human wrist can be generalized to include three DOF: wrist rotation, abduction/adduction, and flex/extend. The upper arm extends from the shoulder and is connected to the lower arm by the elbow. The wrist is at the opposite end of the lower arm. The human arm from the shoulder to the wrist can thus be generalized as a kinematic system that includes a first joint having three rotational DOF connected to a second joint having one DOF by a first linkage, which is connected to a third joint having three DOF by a second linkage.

The master control arm 110a, and similarly the slave control arm 115a can be configured as a kinematic system to include DOFs and linkages that correspond to the DOFs and linkages of the human arm from the shoulder to the wrist. More specifically, the master and/or slave control arms can include seven degrees of freedom which can enable a user using the master control arm to lift and/or manipulate objects using the slave arm in a similar fashion to how the user may otherwise lift or manipulate the object by hand. A base 112 for the master control arm(s) can be positioned behind the user, which can allow unrestricted movement of the user during use of the master control arm.

In one example, three separate joints of the master control arm can correspond to the single joint of the human shoulder in a kinematically equivalent system. In general, the DOFs of a portion of the master control arm corresponding to the human shoulder are the less sensitive DOFs in establishing kinematic equivalence between the master control arm and the user's arm than are DOFs of a portion of the master control arm corresponding to the human forearm. In other words, the location and orientation of the DOFs of the master control arm corresponding to the human shoulder can tolerate the most variation from the corresponding user's arm and still provide kinematic equivalence with the user's arm. One joint of the master control arm can correspond to the human elbow joint, and three separate joints of the master control arm can correspond to the human wrist. The DOFs of the master control arm corresponding to the DOF of the operator's wrist are the most sensitive and least tolerant of variation in establishing kinematic equivalence with the user's arm from the shoulder to the wrist. Therefore, in one aspect, the degree of permissible variation between kinematically equivalent systems can change from one end of a system to another.

In one aspect, the master control arms 110a, 110b can be arranged to provide space between the arms and the platform to provide the user with comfortable access to buttons, switches, levers, panels, or other control structures 125 to enable the user to control the lift system 100.

With further reference to FIG. 1, the system 100 can include position sensors on the master control arms 110a, 110b. The position sensors are associated with the DOF of the master control arm. In one aspect, there is one position sensor for each DOF. The position sensors can be located, for example, at each of the joints. Because the DOF of the master control arm at these joints are rotational, the position sensors can be configured to measure angular position. For example, the position sensor may include an encoder, such as is disclosed in U.S. Pat. No. 6,170,162, which is incorporated herein by reference in its entirety. Other types of encoders, and other types of position sensors, as will be apparent to one having skill in the art, are also contemplated and are considered to be within the scope of this disclosure. In one aspect, the position sensors can detect a change in position of the master control arm at each DOF. This change in position can be used to cause a proportional change in position of the corresponding DOF of the slave arm 115a or 115b. The slave arm can similarly include position sensors for identifying and measuring angular rotations and positions. Using the position sensors, a precise position or orientation of any portion of the master or slave arms with respect to the platform 120 can be accurately determined.

The master control arms 110a, 110b and slave arms 115a, 115b can also include force sensors associated with the DOFs of the arms. The force sensors can be used to measure force, for example, in the master control arm, which can be used to enable force reflection from the slave to the master control arm, or vice versa. The force sensors can also be used to enable gravity compensation of the master and/or slave arms.

In one aspect, there is one force sensor associated with each DOF of the master and slave arms. In another aspect, several DOFs of the master control arm can be accounted for with a multi DOF force sensor. For example, a multi DOF force sensor capable of measuring force in at least four DOFs can be associated with an axis corresponding to an elbow DOF of the user. Additionally, single or multi DOF force sensors can be associated in any combination with axes corresponding to the wrist DOFs of the user. Data from the force sensors can be used to calculate the force at a degree of freedom between the force sensor location and the base 112. The force sensors can include any type of suitable load sensor. One example load sensor includes a strain gauge.

The system 100 can also include one or more gravity sensors. A gravity sensor may be located in a control unit 130 of the platform. In one aspect, the gravity sensor may be part of an inertial measurement unit (IMU). The IMU can measure and report a variety of inertia-related information, such as platform velocity, orientation, and gravitational forces. The IMU can include, for example, a combination of accelerometers and gyroscopes for measuring the inertial information. While multiple gravity sensors or IMUs may be employed in the system, such as having sensors at linkages in the master 110a, 110b or slave arms 115a, 115b, a single sensor may also be sufficient. For example, the control unit can track the angular rotations of a slave arm using the position sensor(s). The control unit can accurately determine gravitational forces, torque, and the like at each slave arm segment or joint by using the position information from the sensors and the inertial information from the IMU in combination.

The master control arms 110a, 110b and the slave arms 115a, 115b can have a variety of operating modes. While, various operating modes for maintaining position proportionality, providing force reflection, providing gravity compensation, and so forth are contemplated, for the purposes of this disclosure, operating modes can be provided for compensating for perturbations with respect to the platform 120 and the load being carried. Some non-limiting example operating modes for perturbation compensation include shock absorption, load orientation maintenance, balance compensation, and external frame referencing. These operating modes can be selected by a user using the user controls 125 and implemented using the control unit 130 to adjust a position of one or more of the slave arms for compensation purposes. While this disclosure primarily discusses example implementations of master and slave arms, the principles of perturbation compensation can be applied in a variety of other situations or applications in the absence of a master/slave relationship. Indeed the perturbation compensation principles as described can be applied in any system, device, or method in which a plurality of mechanical arms supported by a platform and having multiple DOFs is implemented. As a broad example, a platform having a first mechanical arm with a first DOF and a second mechanical arm with a second DOF different from the first DOF can implement the perturbation compensation technology.

The system 100 can include additional global positioning system (GPS) devices, electromagnetic beam radiation emitters 135, electromagnetic or electrostatic field emitters 140, and a variety of other devices and components for assisting in perturbation compensation, which will be described in additional detail below.

Figure 2:
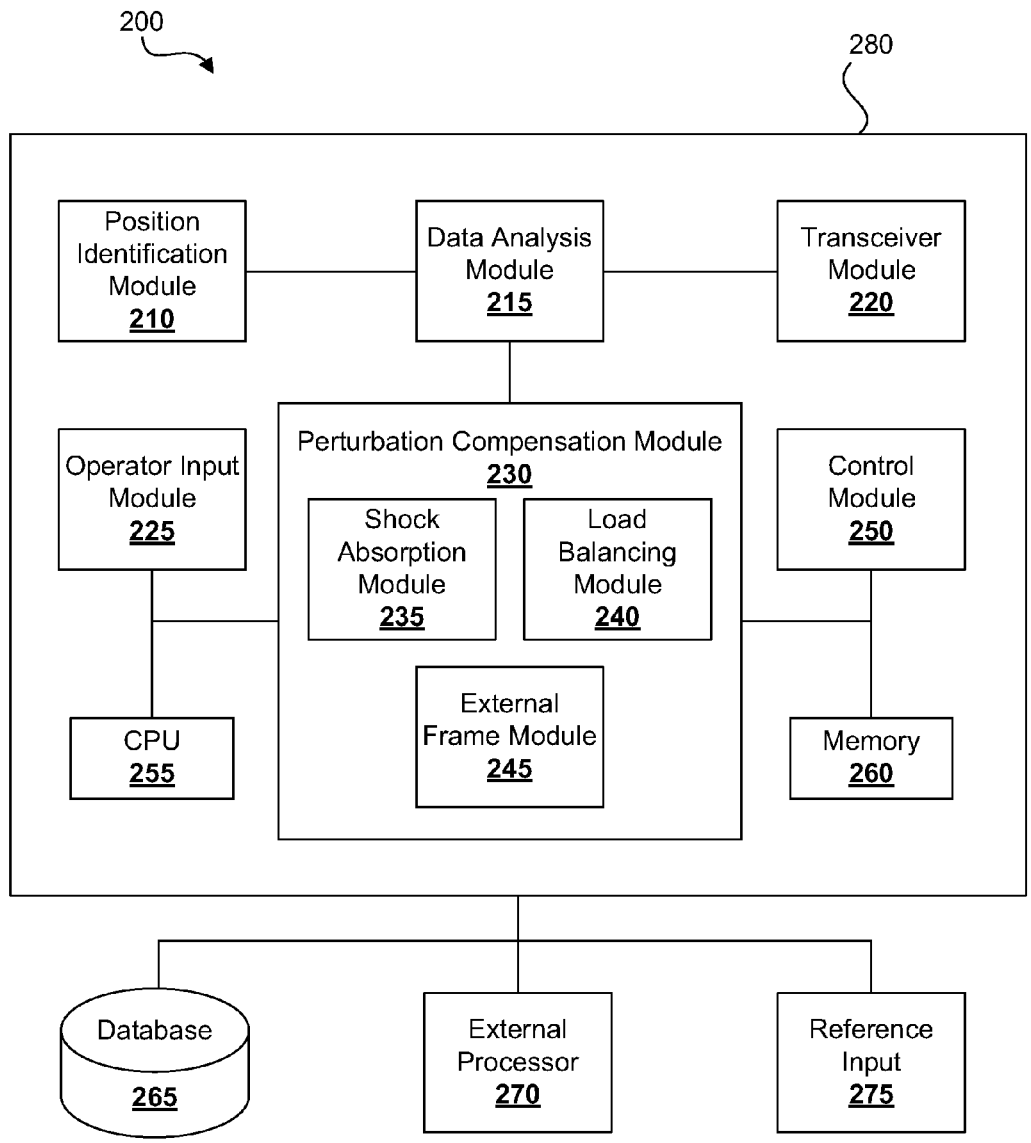
FIG. 2 is a block diagram of a system for compensating for a perturbation external to a platform in accordance with an example of the present technology.

Referring to FIG. 2, a block diagram of a system 200 for compensating for a perturbation external to a platform is illustrated in accordance with an example of the present technology. The system of FIG. 2 can be at least partially implemented on a computing device. For example, the computing device can include a processor 255 capable of processing instructions to perform a variety of operations. The system can include a memory 260 for temporarily or permanently storing instructions or data related to operations performed by the processor. The system of FIG. 2 can be included in the control unit described in FIG. 1, and can be in communication with the master and/or slave arms, as well as the user controls.

The system 200 can include a position identification module 210, a data analysis module 215, a perturbation compensation module 230, and a control module 250. Additional modules and components may also be included as set forth below.

The position identification module 210 can receive data from sensors, devices, databases, and the like. For example, the position identification module can receive gravitational information from a gravity sensor; angular rotational information for joints in mechanical arms from position sensors; velocity or acceleration information from an accelerometer; load information for a load carried by one or more of the mechanical arms from a load sensor; positional information of an external reference point from a database, GPS, or other device; positional information of the platform or arms from a GPS or the like; and any of a variety of other types of positional information from a variety of different types of devices configured for obtaining a particular type of reference data. References to positional data, measurements, instrumentation, or the like will in general refer to position and/or orientation data, measurements, instrumentation, or the like, unless context clearly dictates otherwise.

The position identification module 210 can receive and store normal and perturbed positional data about the platform. In one aspect, the normal positional data can include reference positional data where the platform is arranged on a flat or level surface, and the mechanical arms are not supporting a load. In another aspect, the normal positional data can include reference positional data of the platform and/or arms on any surface, in any position, and bearing any load. In this example, the normal positional data can be current or recent positional data. The current or recent position of the platform or arms may be one in which positioning of the arms has been adjusted to compensate for a previous perturbation. The perturbed positional data obtained by the position identification module can be data relating to a change in one or more data points from one or more data sources as a result of an external perturbation. For example, ground topography under a mobile platform may vary, a position of an external reference point may be altered, and so forth.

The position identification module 210 can further be configured to store normal and perturbed positional data, such as in a local or remote database. The data can be analyzed by a data analysis module 215. The data analysis module can be in communication with the position identification module and/or a database used by the position identification module to obtain the normal and perturbed positional data. The data analysis module can analyze the normal and perturbed positional data to identify a difference in at least one dimension between the normal and perturbed positional data. For example, the dimension can be a physical dimension, such as a change in platform position in an X, Y, or Z direction, or can be an inertial dimension, such as a change in acceleration of the platform. The data analysis module can provide an output or report with the difference in the at least one dimension. The report can be used by a perturbation compensation module 230 to compensate for the difference. The report can also or alternatively be transmitted via a transceiver module 220 using wired or wireless communication links and protocols to another user or device. The report from the data analysis module can include, for example, the change in the at least one dimension from a previous report. The report can also optionally include an analysis of perturbations over a period of time. More specifically, the analysis can indicate trends in past changes and forecasts of potential future changes.

The perturbation compensation module 230 can receive the report from the data analysis module 215. The perturbation compensation module can determine mechanical arm movement instructions to compensate for the difference in the at least one dimension. The instructions for compensation can be based on an immediate perturbation, or can be based on a trend or forecast included in the report. A rate of change in position of the mechanical arms dictated by the compensation instructions can correspond to a rate of perturbation or a rate of change in perturbation.

The perturbation compensation module 230 can enable the perturbation compensating operating modes described above. For example, some contemplated operating modes include shock absorption, load orientation maintenance, balance compensation, and external frame referencing. A desired mode can be selected by a user or operator through an input device. Input at the input device can be received as an input signal by an operator input module 225 in communication with the input device. Alternatively, the operator input module can translate operator manipulation of the input device into the input signal. The perturbation compensation module can receive the input signal from the operator input module. In the absence of operator input and a selected and more active compensating operating mode, a default operating mode can be used. For example, a default operating mode may include a locked arm mode or the shock absorption mode. A locked arm mode may be a mode in which the mechanical arms, or rather the joints or hydraulics thereof, are locked in position, or at least constrained to move precisely as controlled by an operator. The locked arm mode may have limited perturbation compensating capabilities. When the arms are locked, the arms and/or a load carried by the mechanical arms may be subject to any and all perturbations of any degree. As a result, additional stress, strains, torque, etc. may be placed on the arms or the load which can cause damage, structural weakening and the like to the arms or the load, particularly with perturbations of greater magnitudes.

The perturbation compensation module 230 can further include various operating modules for implementing a selected or default compensating operating mode. FIG. 2 illustrates a shock absorption module 235, a load balancing module 240, and an external frame module 245 included with the perturbation compensation module. Of course, these are not intended to be limiting in any way as other modes may be available, as well as a combination of modes. However, for purposes of describing the invention herein, the shock absorption module 235, a load balancing module 240, and an external frame module 245 will be discussed in greater detail below.

The shock absorption module 235 can determine shock absorbing mechanical arm movement instructions for absorbing shock to one or more of the mechanical arms or to a load carried by at least one of the mechanical arms, or both. In one aspect, a degree of shock absorption can be user selected. In another aspect, the degree of shock absorption can be automatically determined based on a weight of a load, a type of load, a degree of shock, or a source of the shock. For example, arm movements to compensate for shock may differ for a heavier load from arm movements to compensate for shock to a lighter load. Also, some load types may be more fragile or otherwise more sensitive to shock and may be cushioned from the shocks differently than more rugged or sturdy loads. Furthermore, a source of the shock can also affect how shock is absorbed. For example, a change in terrain may be cushioned differently than a collision from the side. Shock absorbing mechanical arm movements, can include, for example, upward and downward motions for a vertically uneven terrain to enable a slower or smoother transition of a load from an upward movement to a downward movement, and vice versa. Shock absorbing motions can include upward downward, sideward, forward, and backward motions of any one or more of the linkages and DOFs.

The load balancing module 240 can determine load balancing mechanical arm movement instructions for balancing the platform. The load balancing module can also determine load balancing mechanical arm movement instructions for balancing a load carried by at least one of the mechanical arms, as well as the arms themselves. Thus, for example, if the platform is moving sideways along an upwardly inclined surface and a state of balance of the platform approaches an out of balance state, a position of one or more of the mechanical arms can be adjusted to better maintain a well-balanced state. For example, one or more of the mechanical arms can be extended in the direction of the inclination to provide balance against the platform rolling or tipping.

The load balancing module 240 can also determine load balancing mechanical arm movement instructions for maintaining the load in a level position. One or more of the mechanical arms may be carrying a load which is sensitive to a particular orientation. Perturbations having a tendency to unlevel the load may be compensated for. For example, it may be desirable to avoid spilling hazardous liquid materials being carried in an open container. The arm movement instructions can enable and cause the mechanical arms (i.e., all or a portion thereof) to maintain a position relative to one another and an orientation relative to gravity to avoid tipping and minimize sloshing of the material relative to the open container.

The external frame module 245 can determine external frame of reference mechanical arm movement instructions for maintaining a position of a distal end of at least one of the mechanical arms relative to a frame of reference external to the platform. For example, a platform with the mechanical arms may be used to load or unload objects to or from a ship moored to a dock. Currents or tides in the water supporting the ship and/or dock can cause the ship or dock to rise and fall, rock to and fro, and sway side to side. Without compensating for these perturbations, loading or unloading objects may result in knocking the objects against the dock, ship, or other nearby workers or objects, resulting in damage or injury.

The external frame module 245 can determine arm movement instructions for maintaining a position of a distal end of a mechanical arm relative to a frame of reference external to the platform using, for example, a proximity sensor, an IMU, GPS, and so forth. The proximity sensor, IMU, GPS, etc. can be located on the platform, the external frame of reference, or both. As one example, a proximity sensor on the platform may include a laser beam emitter and a detector. A laser beam emitted from the laser beam emitter can be directed toward the external frame of reference, and a reflection of the laser beam can be detected using the detector. Change in reflectance position, wavelength, time delay from emission to detection, and so forth can be used to detect changes in position of the platform relative to the external frame of reference. For example, instructions for compensating for a downward change in elevation of the platform relative to the external frame of reference may include raising the mechanical arms by the same amount the elevation of the platform changed downwardly. A rate of change in position of the mechanical arms can correspond to a rate of change in the external reference frame.

An IMU can be used to determine movement instructions relative to the external frame of reference by determining a starting position and calculating changes in that position according to inertial measurements. A GPS, or more specifically, a military grade GPS can be used to determine a GPS location of the platform. A GPS location of the external reference may be known and stored in a database 265 internal or external to the platform, or can be determined by a GPS unit on the external frame of reference and transmitted to the transceiver module 220 from a reference input 275. Military GPS precision can be as close as 2 cm. Thus, precise relative GPS data for the platform and the external reference frame can also be used to compensate for perturbations. In another aspect, a differential GPS (DGPS) can be used.

The operator input module 225 can transmit an input signal to the perturbation compensation module 230 to indicate a desired frame of reference for compensation. For example, the operator may select an external frame of reference, or alternatively, the operator may select to use the platform as the frame of reference.

The system 200 can include a control module 250. The control module can receive the mechanical arm movement instructions from the perturbation compensation module 230 and send one or more control signals to the mechanical arms to cause the mechanical arms to move based on the mechanical arm movement instructions. For example, the control module may include a GDC (General DOF Controller). The GDC can be operable to individually control each of the various degrees of freedom available in each of the mechanical arms. Position information obtained from the position identification module 210 can be applied to transformation matrices based on the mechanical arm movement instructions to transform a torque, center of gravity, rotational position, etc. at an individual DOF to a torque, center of gravity, rotational position, etc. corresponding to the movement instruction constraints. The transformations are transmitted to the mechanical arms to carry out the movement instructions.

In one aspect, the operator input module 225 can enable the operator to lock out operator input to the mechanical arms, to limit operator input to the mechanical arms, or to coordinate operator input with the mechanical arm movement instructions when the mechanical arms move based on the mechanical arm movement instructions. For example, if the platform is a mobile platform and the operator has picked up a load with the arms and desires to move the platform to a different location while absorbing shock to the load or maintaining an orientation or balance of the load, the operator may select the lock out operator input option to prevent interference with the perturbation compensation movements of the arms while the operator is moving the platform. In another aspect, operator input can be allowed, but limited. For example, the operator may be moving a wide load with the mobile platform over bumpy terrain with various obstacles on the sides. The operator may select to absorb shock to the load and be locked out from affecting upward or downward movements of the arms, but be enabled to move the load from side to side to avoid the obstacles while the platform moves in a straight line. In another aspect, operator input can be allowed and coordinated with the instructions. For example, the operator may be moving a wide load with the mobile platform over bumpy terrain with various obstacles on the sides at different heights. The operator may move the mechanical arms generally upwardly or downwardly to avoid the obstacles at the various heights in combination with additional upward and downward motions to absorb shock.

Proximity sensors, as described herein, can also be used to assist in avoiding collision of the arms or a load carried by the arms with an obstacle.

In FIG. 2, various components of the system 200 within box 280 surrounding the components can be a part of or included in the platform device. The system can include an external processor 270 in communication with one or more of the modules within box 280 to assist in processing data and/or executing instructions. The external processor 270 can be in addition to the on-board processor 255 or a replacement of the on-board processor. The database 265, while shown outside of box 280 can optionally be included on-board the platform device. In other words, FIG. 2 illustrates a potential configuration and compilation of components of a perturbation compensating system. However, arrangements, configurations, etc. other than those described above or those shown in the figure are also contemplated. Additionally, the lines between modules and other components in the figure are for illustration purposes, and other communication paths and relationships between the modules and other components are also contemplated.

In one aspect, a system for perturbation compensation can include a processor and a memory, the memory including program instructions that when executed by the processor function as the modules described above.

Figure 3:
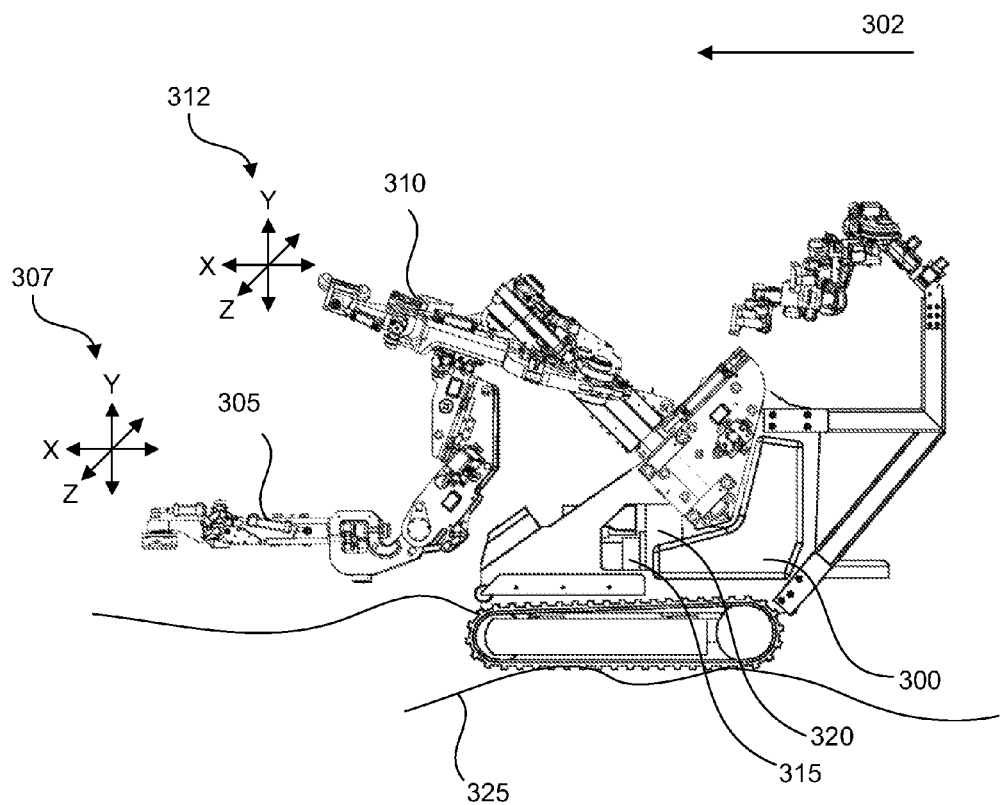
FIG. 3 is a side view of a perturbation compensating platform compensating for shock in accordance with an example of the present technology.

Referring to FIG. 3, a perturbation compensating platform 300 is illustrated in accordance with an exemplary embodiment. The platform includes a plurality of individually controllable mechanical arms 305, 310 coupled to the platform. A position detecting sensor 315 is coupled to the platform to detect a perturbation in a position of the platform. Non-limiting examples of the position detecting sensor include a global positioning system (GPS), an accelerometer, a gyroscope, an altimeter, a gravity sensor, an inertial measurement unit (IMU), a proximity sensor, a computer vision system, and a range finder. The proximity sensor can include, for example, at least one of an electromagnetic field emitter, an electrostatic field emitter, and an electromagnetic radiation beam emitter. The proximity sensor can also include a detector corresponding to the at least one of the electromagnetic field emitter, the electrostatic field emitter, and the electromagnetic radiation beam emitter. A perturbation compensation module 320 is in communication with the mechanical arms and the position detecting sensor and can adjust a position of at least one of the mechanical arms (and any load) to compensate for the perturbation.

The platform 300 of FIG. 3 comprises a mobile platform. For example, the mobile platform can include tracks, wheels, rails, or other mobility features to allow the robotic system to move from one location to another. The mobility features can also provide a stable interface with a supporting surface for the platform when the platform is stationary or in transit. The type of mobility features employed can be selected based on the support surface of the operating environment. For example, tracks can be used in an operating environment with a supporting surface comprising earth, such as soil, sand, rock, etc. In another example, wheels can be used in an operating environment with a supporting surface comprising a hard, relatively smooth surface, such as asphalt, concrete, wood, steel, etc.

FIG. 3 illustrates the platform 300 movable in a general direction indicated by arrow 302 over an uneven terrain 325. An operating mode of the platform can be selected to compensate for shock to reduce strain to the mechanical arms 305, 310. One or more of the mechanical arms can be moved independently of another mechanical arm in one or more directions 307, 312 to compensate for perturbations from the uneven terrain.

Figure 4A:
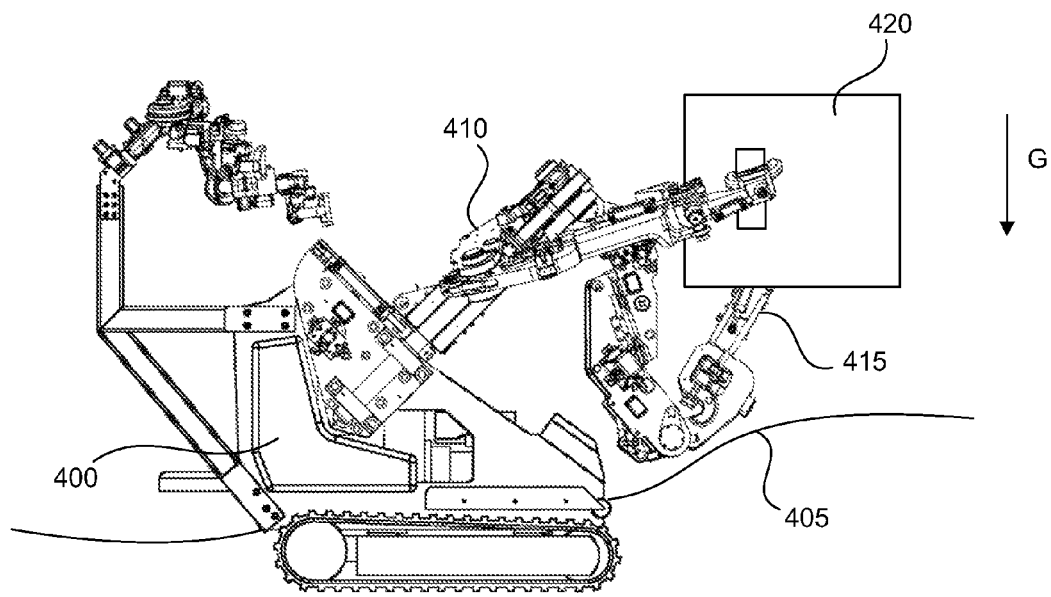
FIGS. 4a-4b are side views of a perturbation compensating platform maintaining an orientation of a load in accordance with an example of the present technology.
Figure 4B:
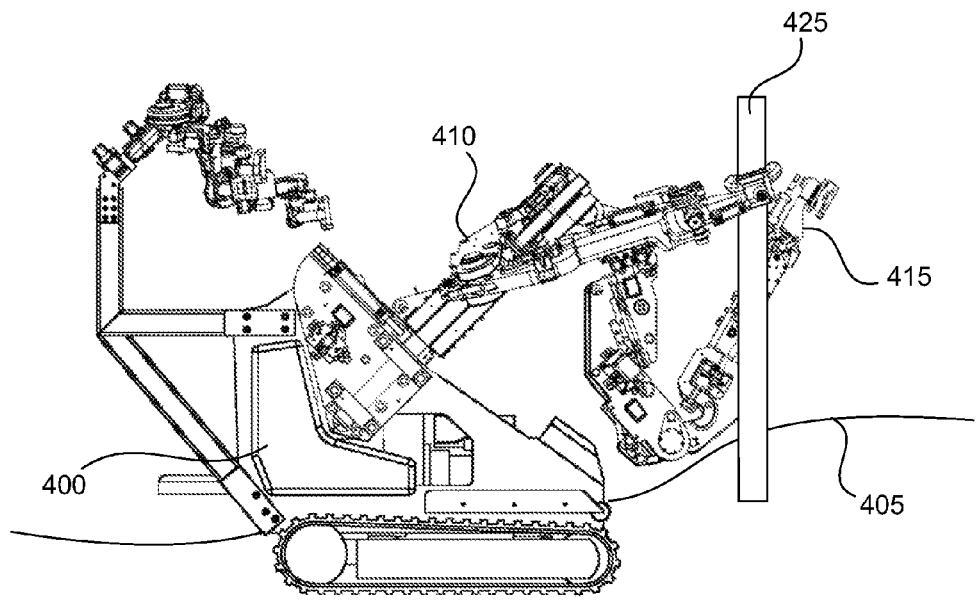

FIG. 4*a* illustrates a mobile platform on an uneven terrain 405 capable of using two mechanical arms 410, 415 to carry a load 420, as well as balance or maintain an orientation of the load relative to gravity G. FIG. 4*b* illustrates an example where a single mechanical arm 410 on a platform 400 is capable of carrying a load 425 and compensating for perturbations to maintain an orientation of the load. In one aspect, the second mechanical arm 415 may be maintained in a static position to stabilize the system. In another aspect, the second mechanical arm 415 can be moved independently to further assist in balancing the platform on the uneven terrain 405.

Figure 5:
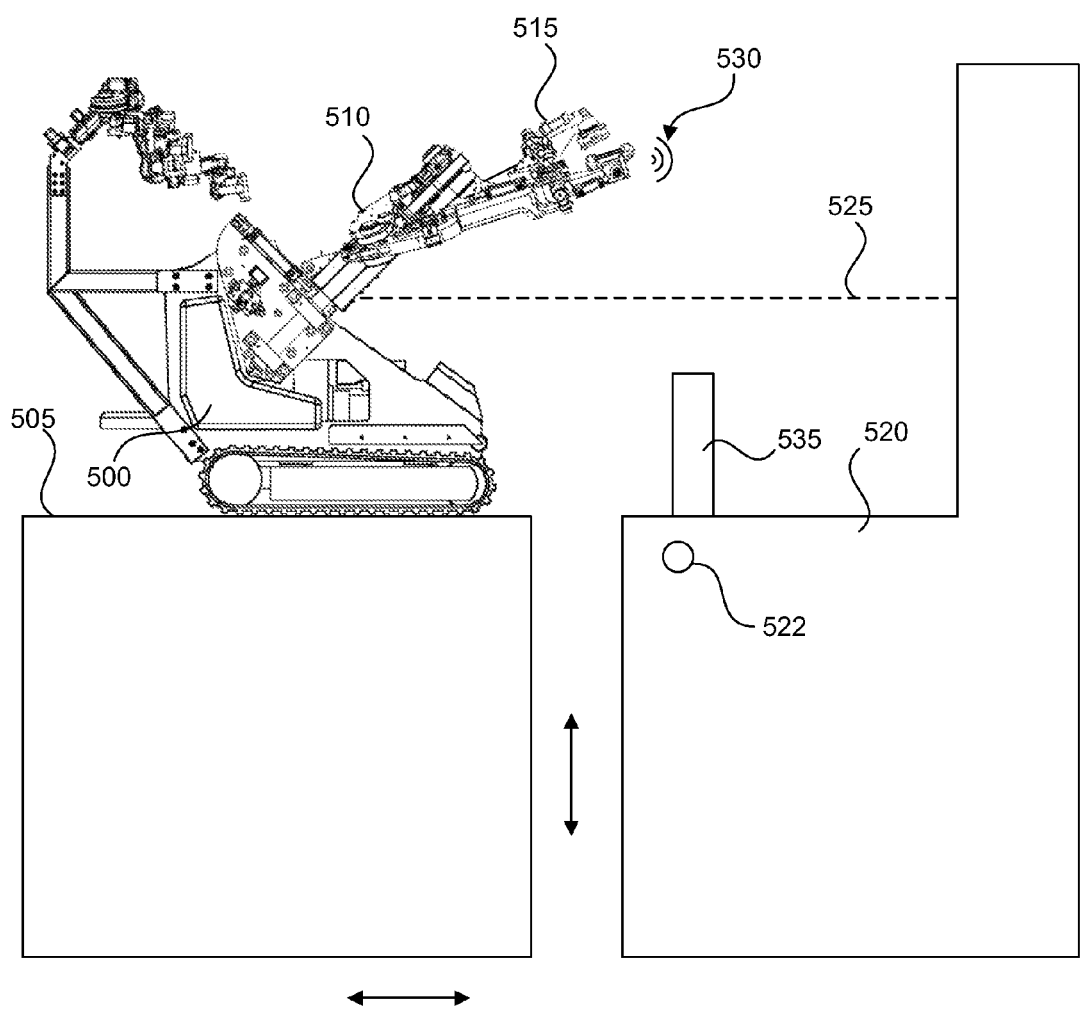
FIG. 5 is a side view of a perturbation compensating platform using an external frame of reference for perturbation compensation in accordance with an example of the present technology.

Referring to FIG. 5, a platform 500 is illustrated on a surface 505 which is not fixed in position relative to an external reference frame 520. For example, the surface may be moveable upward, downward, sideways, forward, or backward relative to the external reference frame. For example, surface 505 may be on a ship and the external reference frame 520 may be a dock, or vice versa. As another example, surface 505 may be a track or flat bed rail car and the external reference frame 520 may be a platform, or vice versa. Also, although the platform in FIG. 5 is illustrated as a mobile platform, the platform may alternately be fixed to the surface 505. Whether the platform is mobile or fixed, the surface 505 and/or the external reference frame may be fixed or mobile.

Where a GPS location of the platform is known, and where a GPS device provided about the external reference frame provides a known GPS location 522 of the external reference frame, GPS coordinates can be used to determine proximity of the platform relative to the external frame of reference. Alternatively, a laser beam 525 can be directed toward the external frame of reference to detect proximity and variations in position relative to the external frame of reference. As another example, an electromagnetic or electrostatic field 530 can be emitted from the platform to detect proximity or position relative to the external frame of reference. Based on the proximity data, the mechanical arms 510, 515 can be moved to compensate for perturbations to the surface 505 to enable smooth and graceful loading or unloading of objects 535 to/from the external frame of reference.

As another example, the platform 505 can include one or more accelerometers configured to measure a perturbation and compensate the mechanical arms in response. As another example, a multi-axis sensing device, such as those made by Systron Donner, Analog Devices, Microstrain, or Gladiator Technologies, may be used to measure the perturbation. In a more detailed example, multiple sensing devices can be included in a system, such as by including a sensing device on the external reference frame 520 and another on the surface 505 or the platform 500. If the external reference frame is stationary and the surface and/or platform are mobile, the stationary readings can be subtracted from the surface/platform readings to calculate how the platform has been perturbed to provide appropriate compensation.

In all of the exemplary embodiments discussed above, the mechanical arms are configured to perform a lifting and translating function of various objects. It is contemplated herein that this function can effectively be combined with the perturbation compensating functions discussed herein, such that the execution of these can be accomplished simultaneously. For instance, in the embodiment shown in FIG. 5, the platform 500 and mechanical arms 510 and 515 located about surface 505 may be caused to move and be positioned to pick up the load 535 from the external frame of reference 520, which, as described, may be moving relative to the surface 505. In this case, the perturbation compensating function (controlled movement of the mechanical arms) may be made active and combined and strategically coordinated with the necessary movement of the mechanical arms needed to approach, lift and translate the load. As an example, as the mechanical arms approach the load 535, movement of the arms in the downward direction may be caused to be at a faster rate if the surface 505 is moving upward relative to the external frame of reference 520, and at a slower rate if the surface is moving downward relative to the external frame of reference. As the mechanical arms attempt to grasp the load, the mechanical arms may further be caused to move both in an upward and downward direction to compensate for the perturbations and to maintain the arms in a level and stable position relative to the load long enough to grasp and lift the load. As the arms lift the load, movement of the arms in the upward direction may be caused to be at a slower rate if the surface 505 is moving upward relative to the external frame of reference 520, and at a faster rate if the surface is moving downward relative to the external frame of reference. Of course this is in comparison to the situation where the surface 505 and external frame of reference 520 are static relative to one another.

Figure 6:
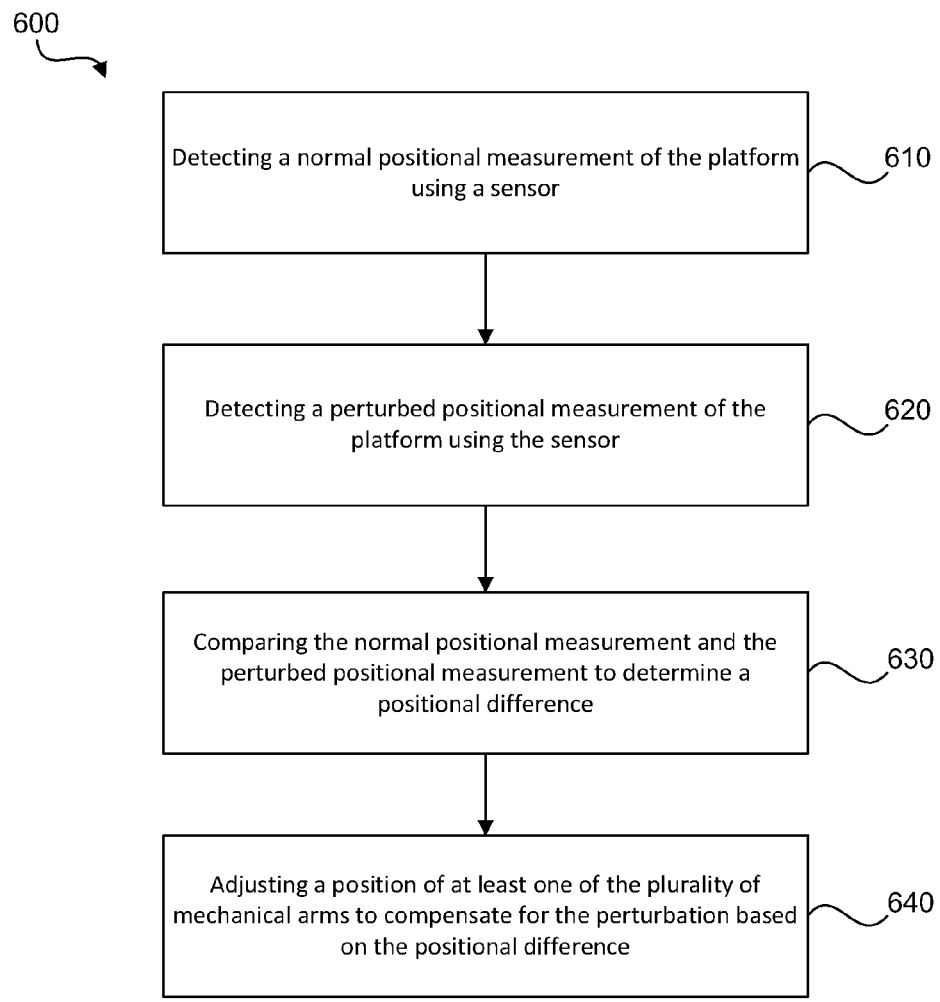
FIGS. 6-7 are flow diagrams of methods for in accordance with an example of the present technology.

Referring to FIG. 6, a flow diagram of a method 600 for compensating for a perturbation external to a platform having a plurality of mechanical arms is shown in accordance with an exemplary embodiment. The method can include detecting 610 a normal positional measurement of the platform using a sensor. A perturbed positional measurement of the platform can also be detected 620 using the sensor. The normal positional measurement and the perturbed positional measurement can be compared 630 to determine a positional difference. A position of at least one of the plurality of mechanical arms can be adjusted 640 to compensate for the perturbation based on the positional difference. For example, compensation can be made by performing arm movements in any number of degrees of freedom (e.g., up to 7 degrees of freedom per arm in the embodiment shown in FIG. 1), where each arm is movable independently of another arm. In one aspect, the method can include adjusting the position of at least two of the plurality of mechanical arms to compensate for perturbations. Although much of the discussion of the platform and arms within this disclosure relates to a platform having two mechanical arms, indeed any number of mechanical arms may be attached to the platform and movable in any number of degrees of freedom to compensate for perturbations.

In one aspect, the platform can be a mobile platform. Accordingly, the method 600 can further include moving the mobile platform between detecting the normal positional measurement and detecting the perturbed positional measurement. Thus, the perturbation may be caused or encountered as a result of movement of the mobile platform.

The method 600 can include adjusting 640 a position of at least one of the plurality of mechanical arms by extending the at least one of the plurality of mechanical arms outwardly from the platform to counter-balance a load carried by a different mechanical arm. While this function can be effected simply to counterbalance a load on a level terrain, the counterbalancing step can also be to compensate for perturbations encountered while carrying the load. While the perturbation can be compensated for in this manner whether or not one or more of the arms is carrying a load, additional consideration of torque, gravitational forces and so forth can be given where a load is being carried as compared with examples where a load is not being carried.

The method 600 for compensating for perturbations can be performed without carrying a load in one or more of the mechanical arms. Alternatively, the method may further comprise carrying a load with the at least one of the plurality of mechanical arms.

The method 600 can include determining a perturbation compensation method for adjusting the position of the at least one of the plurality of mechanical arms. More specifically, the perturbation compensation method can include at least one of absorbing shock to the platform from the perturbation, balancing a load carried by the at least one of the plurality of mechanical arms (including maintaining a level position of the load as a subset thereof), and maintaining a position of a distal end of the mechanical arms relative to an external frame of reference. In one example, the perturbation compensation method for maintaining a position of a distal end of the mechanical arms relative to an external frame of reference is selected when the perturbation external to the platform is a perturbation in a surface relative to the platform and which is independent of a surface supporting the platform. The perturbation compensation method can include, for example, compensating for one or more of pitch, yaw, and roll of at least one of the platform and one or more of the mechanical arms as a result of the perturbation.

The method 600 can also include locking out operator input to the mechanical arms, limiting operator input to the mechanical arms, or coordinating operator input and the perturbation compensation method, at least while one or more of the mechanical arm positions is being adjusted. In some examples, the mechanical arms are slave arms which reflect motions of master control arms, as described above regarding FIG. 1. While the motions or forces on the master control arms are reflected by the slave arms, similarly, motions or forces on the slave arms can be reflected by the master control arms. Thus, for example, if a force in any direction affects a slave arm, an operator using the master control arms may also feel a similar force. Such a configuration can enable the operator to physically feel that, for example, a load is being carried by one or more of the slave arms or that one or more of the slave arms has bumped into something. When the method includes moving the (slave) arms to compensate for a perturbation such movements may be reflected to the master control arms to similarly move or apply forces to the master control arms. In another aspect, the master control arms can remain in a same position while the slave arms are moved for compensation. In yet another aspect, the master control arms can be allowed to move freely and independently of the slave arms while the slave arms are compensating for the perturbation. In yet another aspect, the master control arms can reflect compensation movements of the slave arms while still allowing limited or full user interaction or control of the slave arms.

Figure 7:
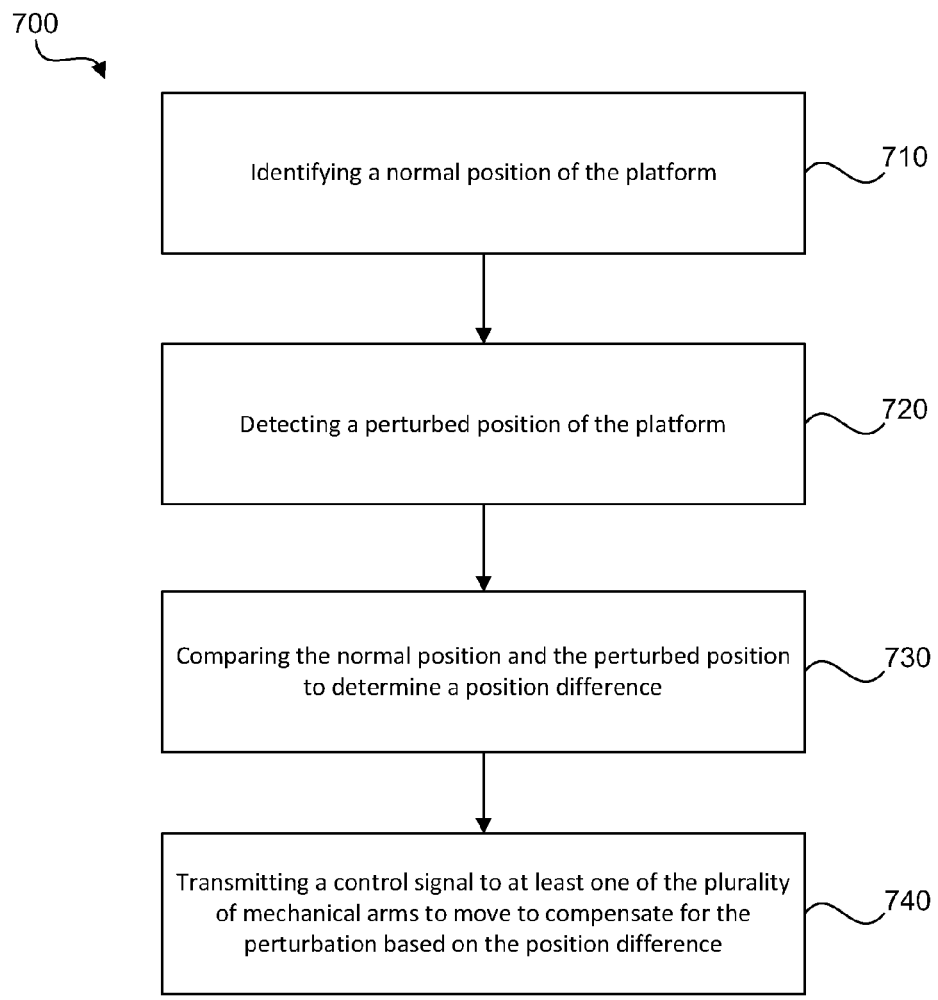

Referring to FIG. 7, a flow diagram of a method 700 for compensating for a perturbation external to a platform having a plurality of mechanical arms is shown in accordance with an exemplary embodiment. The method can include identifying 710 a normal position of the platform; detecting 720 a perturbed position of the platform; comparing 730 the normal position and the perturbed position to determine a position difference; and transmitting 740 a control signal to at least one of the plurality of mechanical arms to move to compensate for the perturbation based on the position difference. The method can also include determining a perturbation compensation method for adjusting the position of the at least one of the plurality of mechanical arms. In a more detailed aspect, determining the perturbation compensation method can include identifying whether manual selection of the perturbation compensation method has been received and selecting a default perturbation compensation method when manual selection of the perturbation compensation method has not been received.

In one aspect, the method 700 can be embodied in a system comprising a processor and a memory, where the memory includes program instructions capable of performing the operations or steps of the method.

Figure 8:
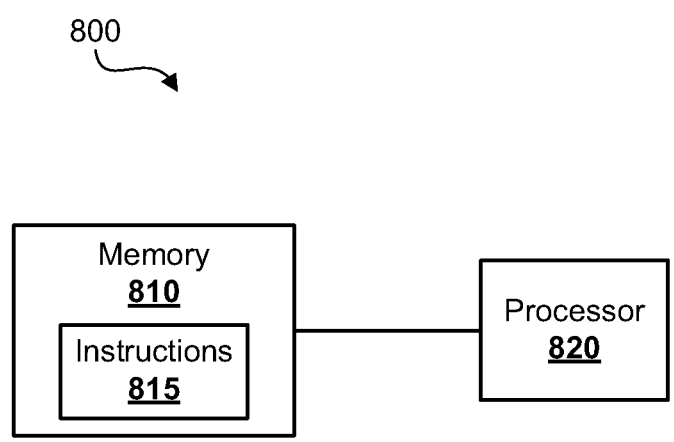
FIG. 8 is a block diagram of a system for compensating for a perturbation external to a platform in accordance with an example of the present technology.

Referring to FIG. 8, a system 800 and/or method can be implemented using a memory 810, processor 820, and/or computer readable medium. For example, an article of manufacture can include a memory or computer usable storage medium having computer readable program code or instructions 815 embodied therein for compensating for perturbations and comprising computer readable program code capable of performing the operations of the methods described. In another example, the memory can include portable memory containing installation files from which software can be installed or remote memory from which installation filed can be downloaded. Also, program instructions stored in the memory can be embodied in installation files or installed files.

The methods and systems of certain embodiments may be implemented in hardware, software, firmware, or combinations thereof. In one embodiment, the method can be executed by software or firmware that is stored in a memory and that is executed by a suitable instruction execution system. If implemented in hardware, as in an alternative embodiment, the method can be implemented with any suitable technology that is well known in the art.

Also within the scope of an embodiment is the implementation of a program or code that can be stored in a non-transitory machine-readable medium to permit a computer to perform any of the methods described above. For example, implementation can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain program instruction and data for use by or in connection with the instruction execution system such as a processor. Computer readable media can comprise any one of many physical media such as, for example, electronic, magnetic, optical, electromagnetic, or semiconductor media. More specific examples of suitable computer-readable media include, but are not limited to, a magnetic computer diskette such as floppy diskettes or hard drives, a random access memory (RAM), a read-only memory (ROM), an erasable programmable read-only memory, or a portable device such as a compact disc (CD), thumb drive, or a digital video disc (DVD).

Various techniques, or certain aspects or portions thereof, may take the form of program code (i.e., instructions) embodied in tangible media, such as floppy diskettes, CD-ROMs, DVDs, hard drives, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

Some of the functional units described in this specification have been labeled as modules, in order to more particularly emphasize their implementation independence. The various modules, engines, tools, or modules discussed herein may be, for example, software, firmware, commands, data files, programs, code, instructions, or the like, and may also include suitable mechanisms. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more blocks of computer instructions, which may be organized as an object, procedure, or function. Nevertheless, the executables of an identified module need not be physically located together, but may comprise disparate instructions stored in different locations which comprise the module and achieve the stated purpose for the module when joined logically together.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices. The modules may be passive or active, including agents operable to perform desired functions.

The modules can also be a combination of hardware and software. In an example configuration, the hardware can be a processor and memory while the software can be instructions stored in the memory.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. A method for compensating for a perturbation external to a platform having a plurality of mechanical arms, comprising:
   detecting a normal positional measurement of the platform using a sensor;
   detecting a perturbed positional measurement of the platform using the sensor;
   comparing the normal positional measurement and the perturbed positional measurement to determine a positional difference; and
   adjusting a position of at least one of the plurality of mechanical arms to compensate for the perturbation based on the positional difference.

2. The method of claim 1, wherein the platform is a mobile platform, the method further comprising moving the mobile platform following detecting the normal positional measurement.

3. The method of claim 1, further comprising locking out operator input to the mechanical arms, limiting operator input to the mechanical arms, or coordinating operator input and the perturbation compensation function.

4. The method of claim 1, wherein adjusting a position of at least one of the plurality of mechanical arms comprises extending the at least one of the plurality of mechanical arms outwardly from the platform to counter-balance a load carried by a different at least one of the plurality of mechanical arms.

5. The method of claim 1, further comprising carrying a load with the at least one of the plurality of mechanical arms.

6. The method of claim 1, wherein the perturbation external to the platform comprises a perturbation in a surface supporting the platform.

7. The method of claim 1, wherein the perturbation external to the platform comprises a perturbation in a surface relative to the platform and which is independent of a surface supporting the platform.

8. The method of claim 1, further comprising determining a perturbation compensation method for adjusting the position of the at least one of the plurality of mechanical arms.

9. The method of claim 8, wherein the perturbation compensation method comprises absorbing shock to the platform from the perturbation.

10. The method of claim 8, wherein the perturbation compensation method comprises positioning a distal end of the mechanical arms relative to an external frame of reference.

11. The method of claim 8, wherein the perturbation compensation method comprises compensating for at least one of pitch, yaw, and roll of at least one of the platform and the mechanical arms.

12. The method of claim 8, wherein the perturbation compensation method comprises balancing a load carried by the at least one of the plurality of mechanical arms.

13. The method of claim 12, wherein balancing the load further comprises maintaining a level position of the load.

14. A perturbation compensating system, comprising:
   a platform;
   a plurality of individually controllable mechanical arms coupled to the platform;
   a position detecting sensor coupled to at least one of the platform and the mechanical arms, the position detecting sensor being operable to detect a perturbation in a position of the platform; and
   a perturbation compensation module in communication with the mechanical arms and the position detecting sensor, wherein the perturbation compensation module is operable to adjust a position of at least one of the platform and at least one of the mechanical arms to compensate for the perturbation.

15. The system of claim 14, further comprising input controls for enabling user selection of a desired perturbation compensation method from a plurality of perturbation compensation methods.

16. A system for compensating for a perturbation external to a platform having a plurality of mechanical arms, the system comprising a processor and a memory, wherein the memory includes program instructions capable of performing the operations of:
   identifying a normal position of the platform;
   detecting a perturbed position of the platform;
   comparing the normal position and the perturbed position to determine a position difference; and
   transmitting a control signal to at least one of the plurality of mechanical arms to move to compensate for the perturbation based on the position difference.

17. The system of claim 16, wherein the memory includes program instructions capable of performing the further operation of determining a perturbation compensation method for adjusting the position of the at least one of the plurality of mechanical arms.

18. The system of claim 17, wherein determining the perturbation compensation method further comprises:
   identifying whether manual selection of the perturbation compensation method has been received; and selecting a default perturbation compensation method when manual selection of the perturbation compensation method has not been received.

19. A computer readable medium comprising program instructions for compensating for a perturbation external to a platform having a plurality of mechanical arms, wherein the program instructions, when executed by a processor, function as a position identification module, a data analysis module, a perturbation compensation module, and a control module, wherein:
  the position identification module is operable to receive and store normal and perturbed positional data about the platform;
  the data analysis module is operable to analyze the normal and perturbed positional data and identify a difference in at least one dimension between the normal and perturbed positional data;
  the perturbation compensation module is operable to determine mechanical arm movement instructions to compensate for the difference in the at least one dimension; and
  the control module is operable to receive the mechanical arm movement instructions and send control signals to the mechanical arms to cause the mechanical arms to move based on the mechanical arm movement instructions.

20. The medium of claim 19, wherein the perturbation compensation module further comprises a shock absorption module, the shock absorption module being operable to determine shock absorbing mechanical arm movement instructions for absorbing shock to a load carried by at least one of the mechanical arms.

21. The medium of claim 19, wherein the perturbation compensation module further comprises an external frame module, the external frame module being operable to determine external frame of reference mechanical arm movement instructions for maintaining a position of a distal end of at least one of the mechanical arms relative to a frame of reference external to the platform.

22. The medium of claim 19, wherein the memory further includes program instructions that when executed by the processor function as an operator input module, the operator input module being in communication with the perturbation compensation module and operable to receive selection of a frame of reference and a perturbation compensation type.

23. The medium of claim 19, wherein the operator input module is further operable to lock out operator input to the mechanical arms, limit operator input to the mechanical arms, or coordinate operator input with the mechanical arm movement instructions when the mechanical arms move based on the mechanical arm movement instructions.

24. The medium of claim 19, wherein the perturbation compensation module further comprises a load balancing module, the load balancing module being operable to determine load balancing mechanical arm movement instructions for balancing a load carried by at least one of the mechanical arms.

25. The medium of claim 24, wherein the load balancing module is further operable to determine load balancing mechanical arm movement instructions for maintaining the load in a level position.

\* \* \* \* \*